Dec. 17, 1968  F. G. FREEMAN  3,416,562

HEART VALVE

Filed Dec. 30, 1965

United States Patent Office 3,416,562
Patented Dec. 17, 1968

3,416,562
HEART VALVE
Frank George Freeman, Solihull, England, assignor to Joseph Lucas (Industries) Limited, Birmingham, England, a British company
Filed Dec. 30, 1965, Ser. No. 517,698
Claims priority, application Great Britain, Oct. 15, 1965, 43,752/65
2 Claims. (Cl. 137—512.15)

ABSTRACT OF THE DISCLOSURE

A valve in which a ring-like part has a conical portion split radially or lengthwise at a plurality of locations to terminate adjacent the apex thereof with each split merging with an arcuate split adjacent the ring-like part for providing a plurality of substantially triangular flaps. A conical support carried by the ring-like part underlies the conical portion and has openings closed by the flaps when fluid pressure is applied to one side but when pressure is applied to the other side the flaps are forced away from the support allowing fluid flow through the openings.

---

This invention relates to valves particularly though not exclusively of the kind intended for use in the human heart to replace a natural valve therein which has become defective.

The object of the invention is to provide a valve in a convenient and effective form.

According to the present invention a valve comprises a ring-like part adapted to be secured in an orifice in a position of use and having a conical portion split radially or lengthwise at a plurality of locations to terminate adjacent the apex thereof with each radial split merging with an arcuate split adjacent the ring-like part for providing a plurality of substantially triangular resilient flaps and a conical support structure carried by the ring-like part underlying the conical portion and having openings adapted to be closed by the flaps, when fluid pressure is applied at one side of the valve and when fluid pressure is applied to the other side the flaps are forced away from the openings to permit flow through the valve.

Figure 1:
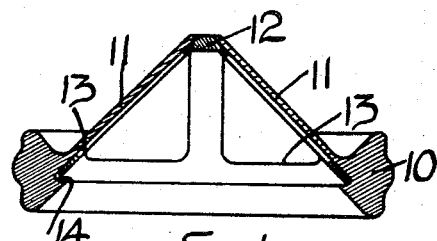
Figure 2:
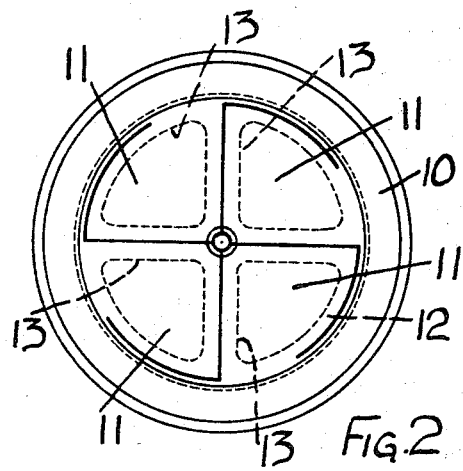

The invention will now be described with reference to the accompanying drawings in which:

FIGURE 1 is a cross-sectional view of an artificial heart valve constructed in accordance with this invention, and FIGURE 2 is a plan view of the valve.

The valve has a ring-like part 10 which is intended to be sewn into a position of use to replace a natural heart valve. Formed integrally with this part 10 is a hollow conical portion which is split to form four segmental flaps 11 which are partially severed from the ring-like part as shown in FIGURE 2. The valve also has a separate support structure 12 in the form of a hollow cone within the flaps 11, with this structure having four segment shaped openings 13 therein. The base of the cone of the structure 12 is engaged in a recess 14 in the interior surface of the ring-like part 10.

It will be seen that, in use, the application of fluid pressure to the side of the valve at which the flaps 11 are disposed causes the flaps to be pressed against the support structure 12, to cover the openings respectively, thus preventing flow through the valve, but when pressure is applied at the other side of the valve, the flaps 11 tend to be forced away from the support structure thus permitting flow through the four openings 13 in the support structures 12. The shapes of the free edges of the flaps 11 are such that they lift away from the support structure to a greater extent at one side, with respect to the conical surface, than at the other. This imparts a swirling motion to the fluid flowing through the valve.

The parts of the valve are preferably formed from synthetic resinous materials, with the support structure 12 being more rigid than the remainder. The required properties for an artificial heart valve are, however, that the materials should be non-toxic, immune to attack by substances contained in the blood and having a density which is as near as possible to that of blood.

It will be apparent that there is substantially no area of the valve over which flow does not take place, this factor being of particular importance in avoiding clotting.

The invention is not to be confined to the showings in the drawings but changes or modifications may be made therein so long as such changes or modifications mark no material departure from the spirit and scope of the appended claims.

Having thus described my invention what I claim as new and desire to secure by Letters Patent is:

1. A valve comprising a ring-like part adapted to be secured in a orifice in a position of use, said ring-like part having a conical portion split radially at a plurality of locations to terminate adjacent the apex thereof with each radial split merging with an arcuate split adjacent the ring-like part for providing a plurality of substantially triangular resilient flaps, and a conical support carried by the ring-like part underlying said conical portion and having openings therein adapted to be closed by the flaps when fluid pressure is applied to one side of the valve and when fluid pressure is applied at the other side the flaps are forced away from the support allowing fluid flow through the openings.

2. The valve as claimed in claim 4 in which said conical portion is integral with said ring-like part and said conical support has a base engaged in a recess provided in the inner surface of said ring-like part.

References Cited

UNITED STATES PATENTS 2,897,835   8/1959   Philippe _____ 137—525.1

OTHER REFERENCES

V. L. Gott, Hinged-Leaflet Valve, etc., Journal of Thoracic Surgery, November 1964, vol. 48, #5, pp. 713–725.

WILLIAM F. O'DEA, Primary Examiner.

H. M. COHN, Assistant Examiner.

U.S. Cl. X.R.

3—1; 137—525.3